United States Patent
Hattori

(10) Patent No.: US 10,581,305 B2
(45) Date of Patent: Mar. 3, 2020

(54) INSULATOR OF STATOR, STATOR FOR ROTATING ELECTRIC MACHINE USING THE SAME, AND METHOD FOR MANUFACTURING STATOR FOR ROTATING ELECTRIC MACHINE

(71) Applicant: TOYOTA JIDOSHA KABUSHIKI KAISHA, Toyota-shi, Aichi-ken (JP)

(72) Inventor: Hiroyuki Hattori, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 400 days.

(21) Appl. No.: 15/504,858

(22) PCT Filed: Aug. 18, 2015

(86) PCT No.: PCT/IB2015/001379
§ 371 (c)(1),
(2) Date: Feb. 17, 2017

(87) PCT Pub. No.: WO2016/027147
PCT Pub. Date: Feb. 25, 2016

(65) Prior Publication Data
US 2018/0226867 A1 Aug. 9, 2018

(30) Foreign Application Priority Data
Aug. 21, 2014 (JP) ................................ 2014-168232

(51) Int. Cl.
*H02K 3/34* (2006.01)
*H02K 3/52* (2006.01)
(Continued)

(52) U.S. Cl.
CPC ............. *H02K 15/10* (2013.01); *H02K 3/345* (2013.01); *H02K 3/522* (2013.01); *H02K 15/12* (2013.01); *H02K 2213/03* (2013.01)

(58) Field of Classification Search
CPC ........... H02K 3/30; H02K 3/32; H02K 3/325; H02K 3/34; H02K 3/345; H02K 3/46; H02K 3/522; H02K 15/10; H02K 15/12
(Continued)

(56) References Cited

U.S. PATENT DOCUMENTS

2010/0244615 A1 9/2010 Kouda
2013/0300248 A1* 11/2013 Ishida ................... H02K 3/345
310/214
2014/0015349 A1 1/2014 Chamberlin et al.

FOREIGN PATENT DOCUMENTS

EP 2525475 A1 11/2012
JP 60-93467 U 6/1985
(Continued)

OTHER PUBLICATIONS

Ishida et al, Machine Translation of JP2013162565, Aug. 2013 (Year: 2013).*
(Continued)

*Primary Examiner* — Quyen P Leung
*Assistant Examiner* — Eric Johnson
(74) *Attorney, Agent, or Firm* — Sughrue Mion, PLLC

(57) ABSTRACT

An insulator for insulating a coil that is wound around a tooth of a stator core from the stator core includes: an axial wall that opposes an axial end surface of the tooth in a state of being assembled to the tooth; and a circumferential wall that is integrally provided with the axial wall and opposes a circumferential-side surface of the tooth. The circumferential wall that is located between the tooth and the coil is constructed of an insulating sheet that is thinner than the axial wall and has foamability.

7 Claims, 9 Drawing Sheets

(51) Int. Cl.
*H02K 15/10* (2006.01)
*H02K 15/12* (2006.01)

(58) Field of Classification Search
USPC .................................................. 310/214, 215
See application file for complete search history.

(56) References Cited

FOREIGN PATENT DOCUMENTS

| | | | |
|---|---|---|---|
| JP | 2006-141173 A | | 6/2006 |
| JP | 2009-213311 A | | 9/2009 |
| JP | 2011-188675 A | | 9/2011 |
| JP | 2012-239322 A | | 12/2012 |
| JP | 2013162565 A | * | 8/2013 |
| JP | 2013-236468 A | | 11/2013 |
| JP | 2014093893 A | | 5/2014 |

OTHER PUBLICATIONS

Narutomi, Machine Translation of JP2009213311, Sep. 2009 (Year: 2009).*

* cited by examiner

INSULATOR OF STATOR, STATOR FOR ROTATING ELECTRIC MACHINE USING THE SAME, AND METHOD FOR MANUFACTURING STATOR FOR ROTATING ELECTRIC MACHINE

BACKGROUND OF THE INVENTION

1. Field of the Invention

The invention relates to an insulator of a stator, a stator for a rotating electric machine using the same, and a method for manufacturing a stator for a rotating electric machine.

2. Description of Related Art

In Japanese Patent Publication Application No. 2011-188675 (hereinafter referred to as JP 2011-188675 A), regarding a split stator iron core that constitutes a stator of an electric motor, a configuration in which an insulator that is formed of resin molded articles provided at each end in an axial direction and a film-like insulating sheet that is provided to cover a tooth-side surface and a yoke-side surface of the split stator iron core are assembled is described. Here, it is described that the film-like insulating sheet is held between a claw that is projected from the insulator and the split stator iron core and thus is assembled to the split stator iron core.

As for the stator of a rotating electric machine, it is preferred to increase a space factor of a coil in a slot that is formed between the teeth of a stator core in order to improve efficiency of the rotating electric machine. For this reason, in order to increase the space factor of the coil in the slot, it is advantageous to adopt a configuration that a space between the teeth of the stator core and the coil is insulated by a thin film-like insulating sheet like the one described in above JP 2011-188675 A.

However, the configuration described in JP 2011-188675 A has such a problem that the coil can be wound only after the film-like insulating sheet is assembled to the split stator iron core together with the insulator and thus a degree of freedom in assembling workability and the like is lowered.

SUMMARY OF THE INVENTION

The invention provides an insulator of a stator, a stator for a rotating electric machine using this insulator, and a method for manufacturing a stator for a rotating electric machine, each of which is designed to increase a space factor in a slot and to increase a degree of freedom in an assembling work and the like of the stator and is allowed to firmly fix the coil to teeth.

An insulator of a stator as an aspect of the invention is an insulator for insulating a coil that is wound around a tooth of a stator core from the stator core, and includes: an axial wall that opposes an axial end surface of the tooth in a state of being assembled to the tooth; and a circumferential wall that is integrally provided with the axial wall and opposes a circumferential-side surface of the tooth. The circumferential wall that is located between the tooth and the coil is constructed of an insulating sheet that is thinner than the axial wall and has foamability.

In the insulator according to the above aspect, the insulating sheet for constituting the circumferential wall may be configured by including a base material formed of an insulating film and a foaming layer that is stacked at least on a surface on the tooth side of this base material.

In this case, an adhesion layer may be stacked on the tooth side of the foaming layer. Alternatively, the foaming layer may also serve as the adhesion layer.

In addition, in the insulator according to the above aspect, the stator core may include: a yoke that extends in the circumferential direction; and the tooth that is radially projected from this yoke and is provided at intervals in the circumferential direction, the insulator integrally has: a flange that opposes the yoke; the two axial walls that extend from this flange in the radial direction of the stator core and each of which opposes both end surfaces in the axial direction of the stator core, and the insulating sheet for constituting the circumferential wall may be configured that both axial ends thereof are respectively joined to the two axial walls that are located on both sides in the axial direction of the stator core.

A stator for a rotating electric machine as another aspect of the invention includes: a stator core having: a yoke that extends in a circumferential direction and a tooth that is radially projected from this yoke and is provided at intervals in the circumferential direction; the insulator that has any of the above configurations and is assembled to the tooth of the stator core from the radial direction; and a coil that is wound around the tooth via the insulator.

A method for manufacturing a stator for a rotating electric machine as yet another aspect of the invention includes: preparing a stator core having a tooth and an insulator integrally having: an axial wall that opposes an axial end surface of the tooth in a state of being assembled to the tooth; and a circumferential wall with foamability that opposes a circumferential-side surface of the tooth and is formed of a thin insulating sheet; winding a coil around the insulator; assembling the insulator, around which the coil is wound, to the tooth of the stator core from a radial direction; and fixing the coil and the insulator to the tooth of the stator core by foaming and expanding the circumferential wall of the insulator by heating the stator core, to which the coil and the insulator are assembled.

According to the insulator, the stator for the rotating electric machine, and the method for manufacturing the stator for the rotating electric machine according to the above aspects, the insulator integrally includes the axial wall and the circumferential wall that is formed of the thinner insulating sheet than the axial wall. Thus, the space factor of the coil in a slot can be increased. In addition, since the insulator, around which the coil is wound, can be assembled to the tooth of the stator core, a degree of freedom in an assembling work and the like can be increased.

In addition, after the stator is assembled, heating of the stator and the like is performed to cause the circumferential wall of the insulator to foam, and a space between the coil and the tooth is thereby filled. Thus, the coil can rigidly be fixed to the tooth by a stretching force of the foaming circumferential wall.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 6A and 6B are enlarged views of one of teeth of a stator in FIG. 1, in which FIG. 6A shows a state before foaming of the insulator and FIG. 6B shows a state after foaming;

DETAILED DESCRIPTION OF EMBODIMENTS

A detailed description will hereinafter be made on an embodiment according to the invention with reference to the accompanying drawings. In this description, specific shapes, materials, numeral values, directions, and the like are merely illustrative for a purpose of facilitating understanding of the invention, and thus can appropriately be changed in accordance with application, a purpose, a specification, or the like. In addition, it is anticipated from the beginning that, when plural embodiments, modified examples, or the like are included in the following description, characteristic parts thereof are appropriately combined to be used.

Figure 1:
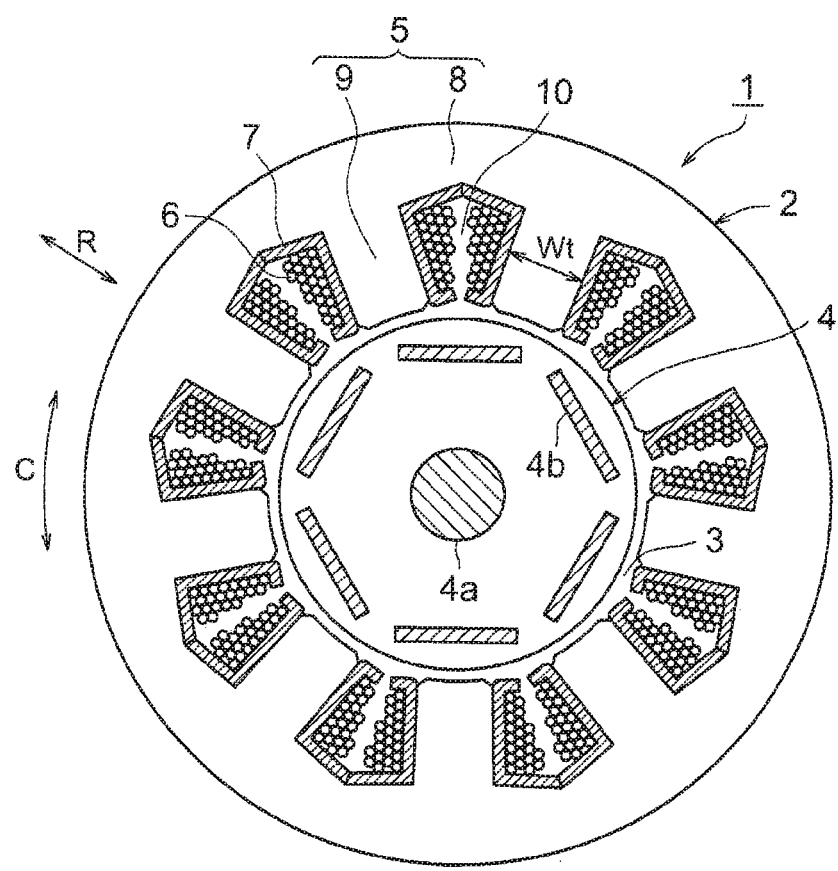
FIG. 1 is a cross-sectional view in a direction to cross an axial direction of a rotating electric machine at right angles, the rotating electric machine including a stator of this embodiment.

FIG. 1 is a cross-sectional view in a direction to cross an axial direction of a rotating electric machine 1 at right angles, the rotating electric machine 1 including a stator 2 of this embodiment. In FIG. 1, a stator radial direction is indicated by an arrow R, and a stator circumferential direction is indicated by an arrow C. In addition, a stator axial direction is a direction that is perpendicular to a sheet of FIG. 1.

The rotating electric machine 1 includes: the substantially cylindrical stator 2; and a rotor 4 that is provided on an inner side in the radial direction of the stator 2 via a gap 3. The rotor 4 is rotatably supported by a case (not shown) for accommodating the rotating electric machine 1 via a shaft 4a fixed at a center. Although the rotor 4 in which a permanent magnet 4b is mounted is shown in FIG. 1, the rotor 4 may be a type of rotor that does not include the permanent magnet.

The stator 2 includes a stator core 5, a coil 6 wound around the stator core 5, and an insulator 7 for insulating the stator core 5 and the coil 6.

The stator core 5 is a stacked body of magnetic plate materials that is configured, for example, by stacking a large number of electromagnetic steel sheets that are punched in a substantially ring shape and integrally coupling the electromagnetic steel sheets by caulking, welding, or the like. The stator core 5 includes a yoke 8 in the substantially ring shape and plural teeth 9 that are projected from the radially inner side of the yoke 8 and formed at specified intervals in the circumferential direction. In this way, a groove-shaped slot 10 is formed to be opened to both sides in the axial direction and to the radially inner side in a space between the adjacent teeth 9 in the circumferential direction. In addition, in this embodiment, the tooth 9 is formed to have a constant width Wt, which is in a direction to cross the radial direction at the right angles. However, the tooth is not limited to that with a constant width but may have another shape, such as a trapezoidal shape, in which the width is decreased toward an inner radial side.

Here, it is described in this embodiment that the stator core 5 is integrally formed as the stacked body of the ring-shaped electromagnetic plate materials. However, the stator core 5 may be formed of split cores, in each of which the yoke 8 is split on both sides of the tooth 9 with a specified gap being formed therebetween in the circumferential direction. In this case, the split core exhibits a substantial T shape in a plan view by the substantially arcuate yoke and the tooth. The stator core may be configured as follows. Such split cores are arranged in the ring shape, a cylindrical case is subjected to shrink-fitting on an outer circumferential side thereof and is externally mounted thereto by press-fitting or the like, and, in this way, the split cores and the cylindrical case are integrally coupled. In addition, the stator core 5 may be formed as a powder magnetic core that is formed by compressing and molding magnetic powder with a resin coating in molding dies.

The coil 6 is formed by winding a conductive wire, such as a copper wire having an insulating film, around the insulator 7. In this embodiment, the coil 6 is wound around the each tooth 9 in a concentrated winding method. Although the conductive wire, which constitutes the coil 6, is shown to have a circular cross section in FIG. 1 (and FIG. 6), the shape thereof is not limited thereto. The conductive wire may have another cross-sectional shape such as a flat square shape.

The insulator 7 has a function of electrically insulating the stator core 5 and the coil 6. In addition, in this embodiment, the insulator 7 also has a function to fix the coil 6 to the stator core 5.

Figure 2:
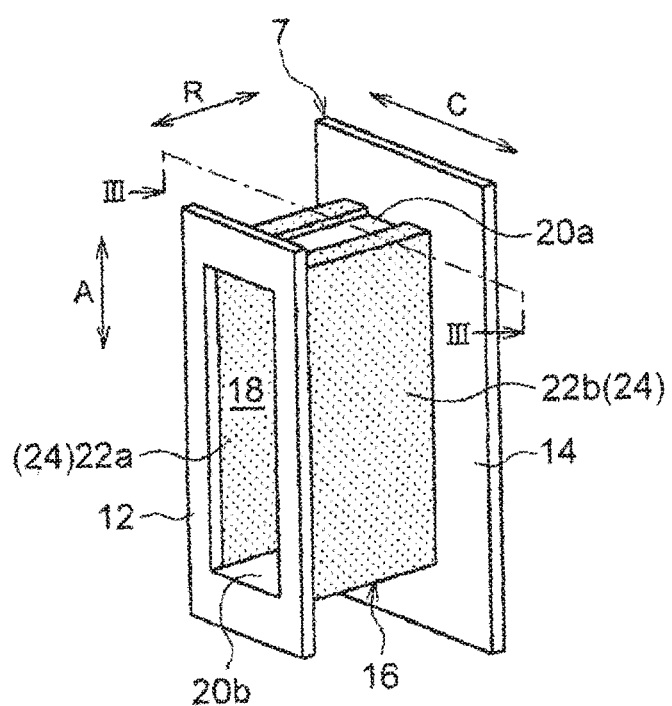
FIG. 2 is a perspective view of an insulator.
Figure 3:
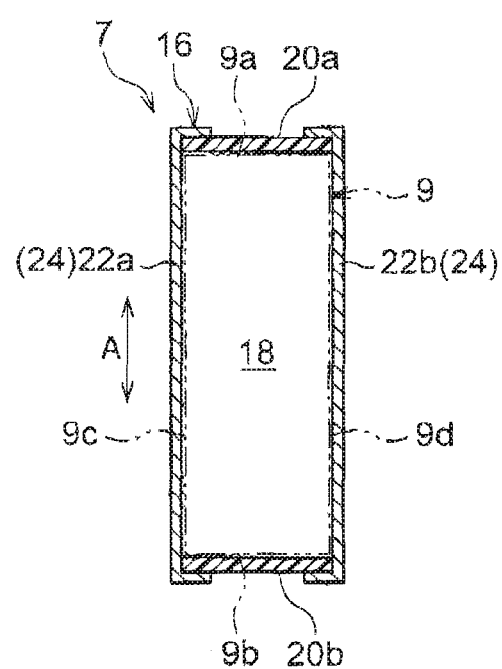
FIG. 3 is a cross-sectional view taken along in FIG. 2.
Figure 4:
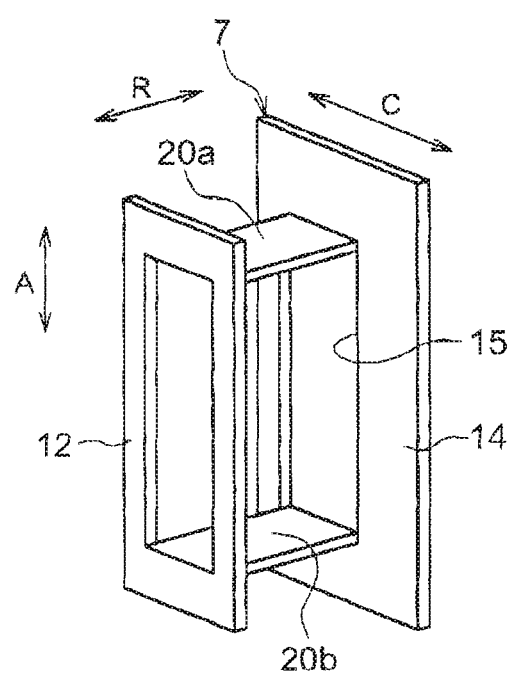
FIG. 4 is a perspective view of the insulator in a state that a circumferential wall is removed.

FIG. 2 is a perspective view of the insulator 7. FIG. 3 is a cross-sectional view taken along in FIG. 2. In addition, FIG. 4 is a perspective view of the insulator 7 in a state that a circumferential wall is removed. Furthermore, FIG. 5 includes a perspective view and a partial enlarged view of an insulating sheet that constitutes a circumferential-side wall of the insulator 7. In FIG. 2 to FIG. 4, the stator axial direction is indicated by an arrow A.

As shown in FIG. 2, in a state of being assembled to the tooth 9 of the stator core 5, the insulator 7 integrally includes: an inner radial side flange 12 that is located on the radially inner side and has a rectangular frame shape; an outer radial side flange 14 that is located on a radially outer side and has a larger rectangular frame shape than the inner radial side flange 12; and a cylindrical main body 16 that is coupled between the inner radial side flange 12 and the outer radial side flange 14. The inner radial side flange 12 and the outer radial side flange 14 extend in external directions to cross the radial direction at the right angles from both side ends in the radial direction of the main body 16.

The main body 16 of the insulator 7 has a space 18 in a rectangular cuboid shape. This space 18 is formed in the shape and dimensions to be able to accommodate the tooth 9 of the stator core 5. In addition, as shown in FIG. 3, when the insulator 7 is assembled in a state of accommodating the tooth 9 in the space 18 therein, the main body 16 of the insulator 7 integrally has: axial walls 20a, 20b that respectively oppose axial end surfaces 9a, 9b of the tooth 9; and circumferential walls 22a, 22b that respectively oppose circumferential-side surfaces 9c, 9d of the tooth 9.

Each of the axial walls 20a, 20b, which constitute the main body 16 of the insulator 7, is coupled to the inner radial side flange 12 and the outer radial side flange 14 on both sides thereof in the radial direction (the arrow R). The inner radial side and outer radial side flanges 12, 14, which constitute the insulator 7, and the axial walls 20*a*, 20*b* are integrally molded by injection molding an insulating resin such as polyphenylene sulfide (PPS). In addition, the outer radial side flange 14 is formed with an opening 15 for inserting the insulator 7 in the tooth 9 from the radially inner side.

Figure 5:
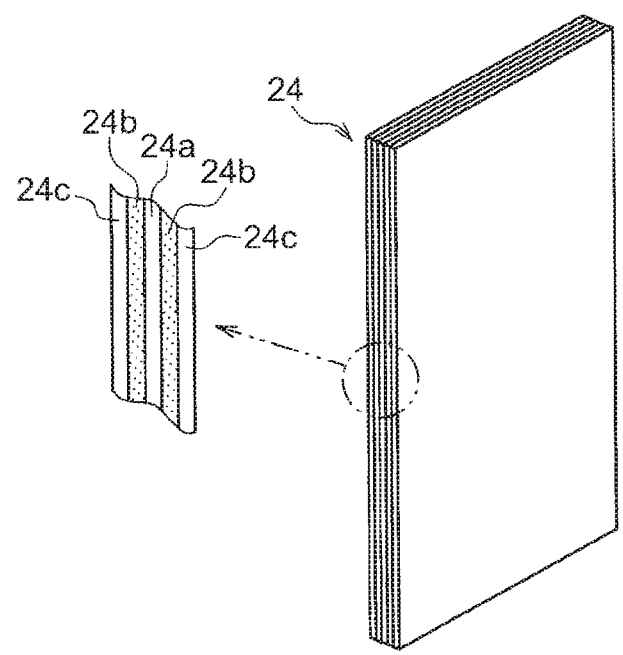
FIG. 5 includes a perspective view and a partial enlarged view of an insulating sheet that constitutes a circumferential-side wall of the insulator.

Meanwhile, the circumferential walls 22*a*, 22*b*, which constitute the main body 16 of the insulator 7, are each constructed of an insulating sheet 24. As shown in FIG. 5, the insulating sheet 24 is configured by including: a base material 24*a* that includes an insulating film made of a resin such as polyethylene naphthalate; a foam layer 24*b* that is stacked on surfaces on both sides of the base material 24*a*; and an adhesion layer 24*c* that is stacked on each of the foam layers 24*b*.

The foam layer 24*b*, which constitutes the insulating sheet 24, has a characteristic (foamability) of foaming (expanding) when being heated to a specified temperature. A known or well-known foaming material (for example, an epoxy-based foamed resin material or the like) can be used for the foam layer 24*b*. In addition, the adhesion layer 24*c*, which constitutes the insulating sheet 24, can be formed by using an adhesive made of an unsaturated polyester-based resin material or the like, for example. Furthermore, the adhesion layer 24*c* is preferably formed by using a heat-sensitive adhesive that exhibits an adhesion property by heating. This produces such advantages that the insulating sheet 24 can easily be handled at room temperature and the insulator 7 can easily be manufactured.

Referring back to FIG. 2, each of the circumferential walls 22*a*, 22*b* of the main body 16 of the insulator 7 is formed by forming the insulating sheet 24 as described above in appropriate size and integrally joining both axial ends thereof in folded states to the axial walls 20*a*, 20*b*. The insulating sheet 24, which constitutes each of the circumferential walls 22*a*, 22*b* just as described, can integrally be joined to the axial walls 20*a*, 20*b* by arranging the insulating sheet 24 in the molding dies in advance and insert molding the insulating sheet 24 when the flanges 12, 14 and the axial walls 20*a*, 20*b* are molded as described above. Alternatively, the insulating sheet 24 may be adhered to each of the axial walls 20*a*, 20*b* by an adhesion layer provided on a surface thereof, the other adhesive, or the like.

Referring to FIG. 3, the insulating sheet 24, which constitutes each of the circumferential walls 22*a*, 22*b* of the insulator 7, is formed to be thinner than the axial walls 20*a*, 20*b* in a state before heat foaming, which will be described below. In this way, compared to a case where the circumferential walls 22*a*, 22*b* of the main body 16 of the insulator 7 are integrally molded from the same resin material as the axial walls 20*a*, 20*b* in a concurrent manner with the axial walls 20*a*, 20*b*, it is possible to increase a space factor that is a volume ratio of the coil 6 to occupy the slot 10 (see FIG. 1). As a result, efficiency of the rotating electric machine can be improved.

Figure 6A:
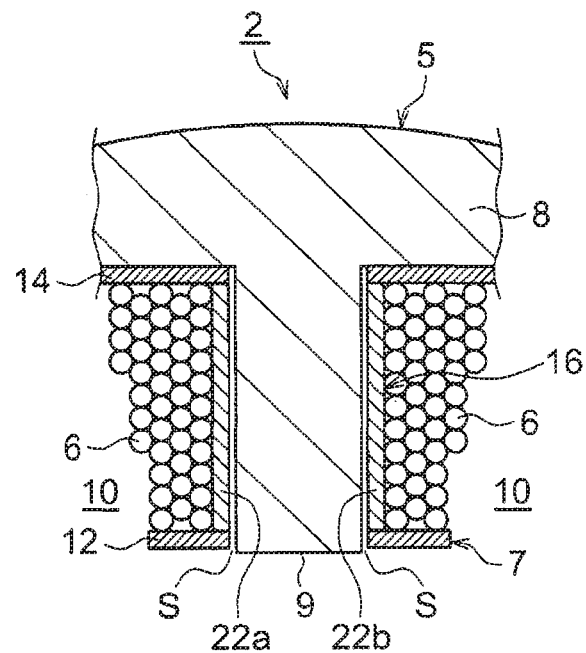
Figure 6B:
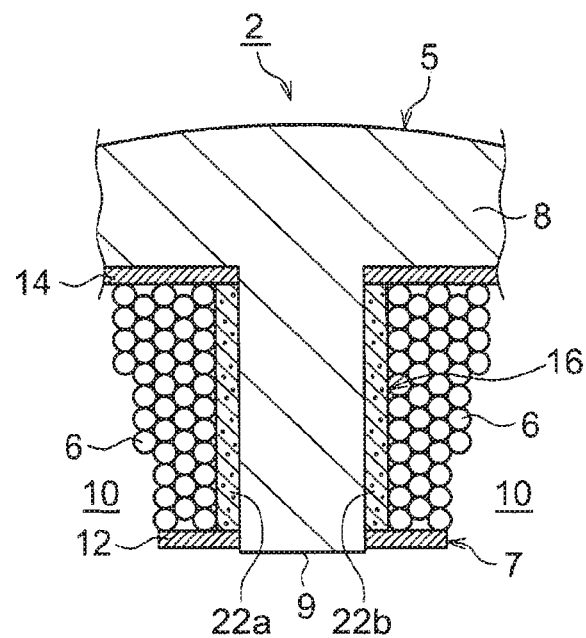

FIGS. 6A, 6B are enlarged views of one of the teeth 9 of the stator 2 in the rotating electric machine 1 shown in FIG. 1. As described above, in this embodiment, the tooth 9 is formed to have the constant width Wt, which is in the direction to cross the radial direction at the right angles. On the contrary, the yoke 8 facing the slot 10 is formed such that a radial width is not a constant width, that the radial width is the largest at a position corresponding to a root of the tooth 9, and that the radial width is the smallest at a center position of the slot 10 in the circumferential direction. A wall surface of the yoke 8 that opposes the slot 10 and is formed just as described (that is, a radially outer side wall surface of the slot 10) is configured to have a planar shape, to which the outer radial side flange 14 tightly contacts, when the insulator 7 is assembled to the tooth 9.

In addition, as shown in FIG. 6A, when the insulator 7 with the main body 16, around which the coil 6 is wound, is fitted to the tooth 9 from the radially inner side, a space S as an assembling margin is formed between the tooth 9 and each of the circumferential walls 22*a*, 22*b* of the main body 16.

After the coil 6 and the insulator 7 are assembled to each of the teeth 9 of the stator core 5, the stator 2 is heated to a specified temperature. Then, as shown in FIG. 6B, the foam layer 24*b* of the insulating sheet 24, which constitutes each of the circumferential walls 22*a*, 22*b* of the insulator 7, foams and expands. In this way, the space S, which is formed between the insulator 7 and the tooth 9 at the time of the assembly, is filled. At the same time, since the circumferential walls 22*a*, 22*b* also expand to the coil 6 side, a space between the coil 6 and each of the circumferential walls 22*a*, 22*b* is also filled in a manner to enter a recess between the conductive wires for constituting the coil 6. Accordingly, due to a stretching force that is generated by the expansion of the insulating sheet 24, the circumferential walls 22*a*, 22*b* are brought into a state of pressing the tooth 9 from both sides in the circumferential direction. As a result, the insulator 7 and the coil 6 are stably fixed to the tooth 9 without causing rattling thereof.

In addition, the adhesion layers 24*c*, which constitute the surfaces on both sides of the insulating sheet 24, exhibit viscosity by heating at the time of foaming. Accordingly, each of the circumferential walls 22*a*, 22*b* is adhered to the circumferential-side surface of the tooth 9 and the coil 6. In this way, the coil 6 and the insulator 7 are rigidly fixed to the tooth 9.

Figure 7:
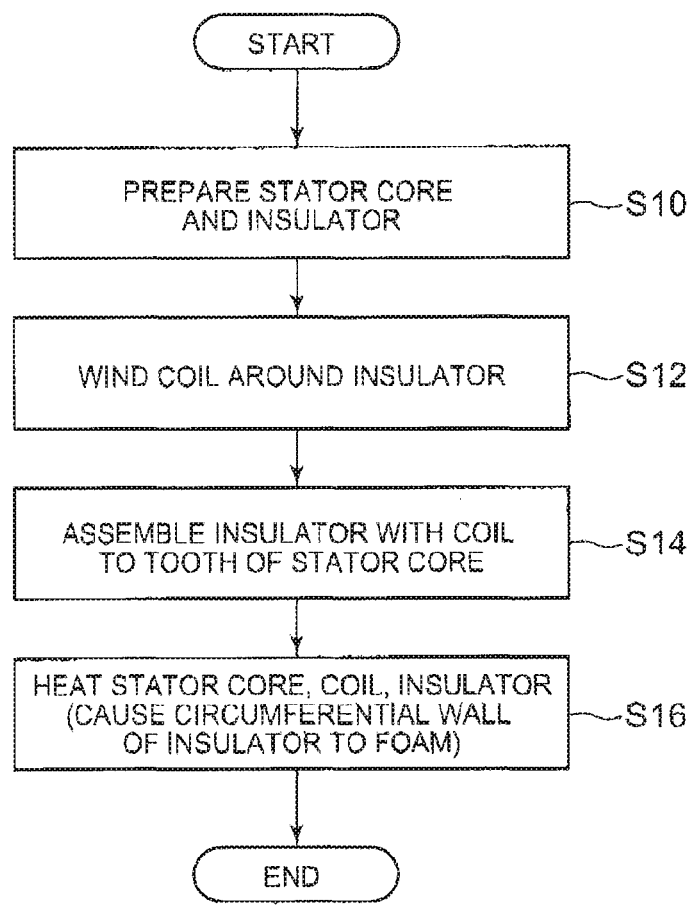
FIG. 7 is a flowchart of a procedure of a method for manufacturing a stator.

FIG. 7 is a flowchart of a procedure of a method for manufacturing the above-described stator 2 for the rotating electric machine. First, in step S10, the stator core 5 and the insulator 7 are prepared. The configurations of the stator core 5 and the insulator 7 are as described above.

Next, in step S12, the coil 6 is wound around the insulator 7.

Then, in step S14, the insulator 7, around which the coil 6 is wound, is fitted and assembled to the tooth 9 of the stator core 5 from the radially inner side.

Then, in step S16, the stator core 5, to which the coil 6 and the insulator 7 are assembled, is heated. In this way, the circumferential walls 22*a*, 22*b* of the insulator 7 foam and expand, and the coil 6 and the insulator 7 are fixed to the tooth 9 of the stator core 5.

It should be noted that a connection process for electrically connecting the coils 6 that are respectively fixed to the teeth 9 of the stator core 5 may be performed either after step S16 or between steps S14 and S16.

As described above, according to the stator 2 for the rotating electric machine of this embodiment, the insulator 7 integrally includes the axial walls 20*a*, 20*b* and the circumferential walls 22*a*, 22*b*, each of which is formed of the thinner insulating sheet 24 than each of the axial walls 20*a*, 20*b*. Accordingly, the space factor of the coil 6 in the slot 10 can be increased at the time of winding of the coil 6. In addition, since the insulator 7, around which the coil 6 is wound, can be assembled to the tooth 9 of the stator core 5, a degree of freedom in an assembling work and the like can be increased.

In addition, after the insulator 7, around which the coil 6 is wound, is assembled, the stator 2 is heated to cause the circumferential walls 22a, 22b of the insulator 7 to foam, and the space between the coil 6 and the tooth 9 is filled. Thus, the coil 6 can rigidly be fixed to the tooth 9 by the stretching force of each of the foaming circumferential walls 22a, 22b.

Figure 8A:
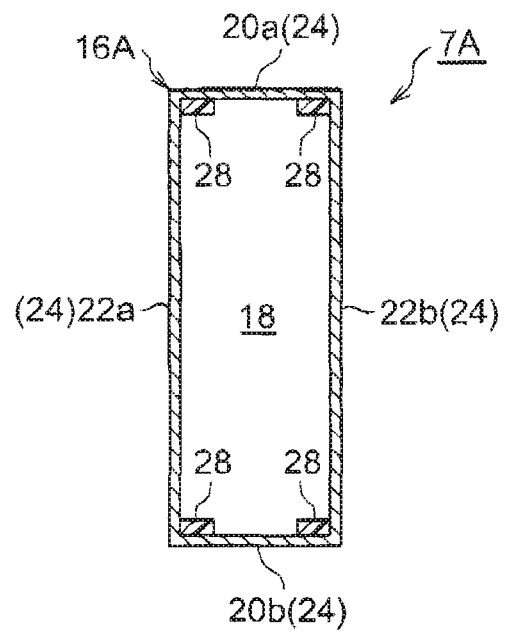
FIGS. 8A, 8B are each similar to FIG. 3 and each show a modified example of the insulator.
Figure 8B:
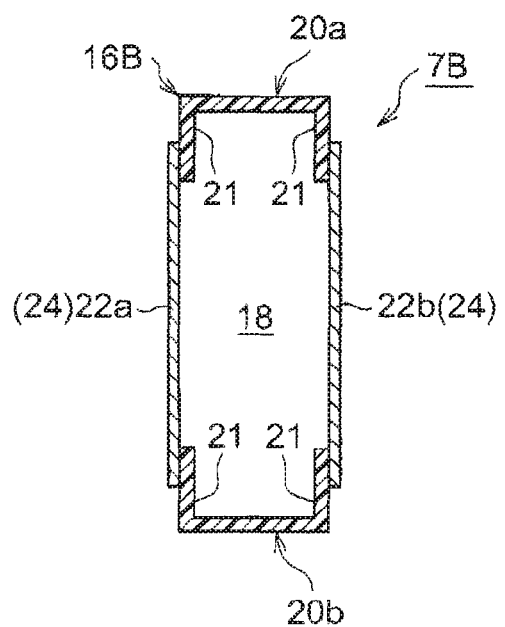

FIGS. 8A, 8B are each similar to FIG. 3 and each show a modified example of the insulator. Referring to FIG. 8A, a main body 16A of an insulator 7A includes four columns 28 for coupling the inner radial side flange 12 and the outer radial side flange 14. In this insulator 7A, each of the axial walls 20a, 20b of the main body 16A is configured by including the two columns 28 that are aligned in the circumferential direction, and a thickness of each of the columns 28 is set to be the same as a thickness of each of the axial walls 20a, 20b that is described above and for which FIG. 3 is referred. Then, a portion of each of the axial walls 20a, 20b is constructed of the insulating sheet 24 with the foamability that is stretched between the above two columns 28. In this way, a space between a coil end, which is an axial end of the coil 6, and the axial end surface of the tooth 9 in the stator 2 is pressed and adhered by the foaming insulating sheet 24. Thus, the fixed states of the coil 6 and the insulator 7 to the stator core 5 can further be rigid.

Referring to FIG. 8B, an insulator 7B is formed with extension sections 21 that extend into the slot 10 from both ends in the circumferential direction of each of the axial walls 20a, 20b for constituting a main body 16B. Then, the insulating sheet 24, which constitutes each of the circumferential walls 22a, 22b of the main body 16B, is formed to be shorter than an axial length of the slot 10 and is stretched across the above extension sections 21. In other words, in the insulator 7B, not the entirety but a portion of each of the circumferential walls 22a, 22b of the main body 16B is constructed of the insulating sheet 24. This has such an advantage that a use amount of the insulating sheet 24 can be reduced.

Figure 9A:
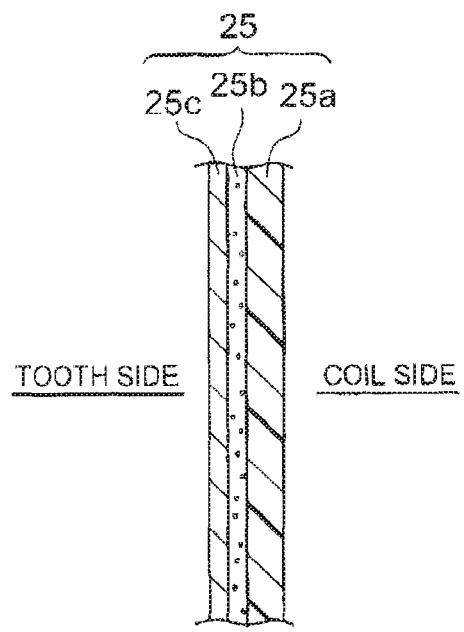
FIGS. 9A, 9B are cross-sectional views that respectively show modified examples of the insulating sheet.

For the embodiment in FIG. 5, as described above, the description has been made on the example of the insulating sheet 24 in which the foam layer 24b is provided on both of the surfaces of the base material 24a, which is formed of the insulating film, and the adhesion layer 24c is provided on the surfaces of the each foam layer 24b. However, the insulating sheet 24 is not limited thereto. For example, like an insulating sheet 25 shown in FIG. 9A, a foaming layer 25b and an adhesion layer 25c may be formed and stacked only on a surface on the tooth side of a base material 25a. In this way, the stretching force that is generated by foaming of the insulating sheet 25 acts on the coil 6. Thus, the coil 6 and the insulator 7 can rigidly be fixed to the tooth 9.

Figure 9B:
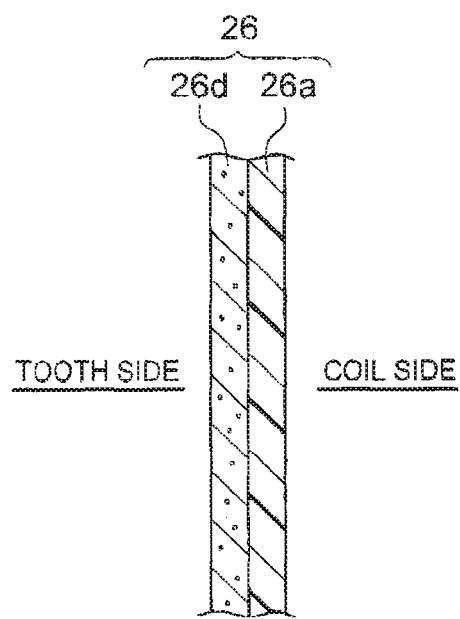

In addition, like an insulating sheet 26 shown in FIG. 9B, a foaming adhesion layer 26d that has both of the foamability and the adhesion property may be formed and stacked on a surface on the tooth side of a base material 26a. In this case, the foaming adhesion layer 26d may also be formed and stacked on a surface on the coil side of the base material 26a.

It should be noted that the invention is not limited to the embodiment and the modified examples thereof, which are described above. It is needless to say that various modifications and improvements can be made to the invention within the items described in the claims of the subject application and equivalents thereof.

The invention claimed is:

1. An insulator for insulating a coil wound around a tooth of a stator core, the insulator comprising:
    two axial walls that respectively oppose two axial end surfaces of the tooth in a state of being assembled to the tooth; and
    two circumferential walls that are integrally provided with the two axial walls and respectively oppose a circumferential-side surfaces of the tooth, wherein both axial ends of each of the two circumferential walls are folded and joined to an axially outer side of the two axial walls, respectively,
    the circumferential walls that are located between the tooth and the coil are constructed of an insulating sheet, the circumferential walls are thinner than the two axial walls and have foamability.

2. The insulator according to claim 1, wherein
    the insulating sheet for constituting the circumferential wall is configured by including a base material formed of an insulating film and a foaming layer that is stacked at least on a surface on a tooth side of the base material.

3. The insulator according to claim 2, wherein
    an adhesion layer is stacked on the tooth side of the foaming layer.

4. The insulator according to claim 2, wherein
    the foaming layer also serves as an adhesion layer.

5. The insulator according to claim 1, wherein
    the stator core includes: a yoke that extends in a circumferential direction; and the tooth is radially projected from the yoke and is provided at intervals in the circumferential direction,
    the insulator integrally has: a flange that opposes the yoke; the two axial walls that extend from the flange in a radial direction of the stator core and each of which opposes both end surfaces in an axial direction of the stator core.

6. A stator for a rotating electric machine, the stator comprising:
    a stator core having: a yoke that extends in a circumferential direction and a tooth that is radially projected from the yoke and is provided at intervals in the circumferential direction;
    an insulator that is assembled to the tooth of the stator core from a radial direction; and
    a coil that is wound around the tooth via the insulator, and the insulator including
        two axial walls that respectively oppose two axial end surfaces of the tooth in a state of being assembled to the tooth, and
        two circumferential walls that are integrally provided with the two axial walls and respectively oppose a circumferential-side surfaces of the tooth, wherein both axial ends of each of the two circumferential walls are folded and joined to an axially outer side of the two axial walls, respectively,
    the circumferential walls that are located between the tooth and the coil are constructed of an insulating sheet, the circumferential walls are thinner than the axial walls and have foamability.

7. A method for manufacturing a stator for a rotating electric machine, the method comprising:
    preparing a stator core having a tooth and an insulator integrally having: two axial walls that respectively oppose axial end surfaces of the tooth in a state of being assembled to the tooth; and two circumferential walls with foamability that respectively oppose a circumferential-side surfaces of the tooth, wherein both axial ends of each of the two circumferential walls are folded and joined to an axially outer side of the two axial walls, respectively, and is formed of a thin insulating sheet;

winding a coil around the insulator;

assembling the insulator, around which the coil is wound, to the tooth of the stator core from a radial direction; and fixing the coil and the insulator to the tooth of the stator core by foaming and expanding the two circumferential walls of the insulator by heating the stator core, to which the coil and the insulator are assembled.

\* \* \* \* \*